(12) United States Patent
Oda (10) Patent No.: US 9,665,946 B2
(45) Date of Patent: May 30, 2017

(54) ARTICLE CONVEYOR SYSTEM

(71) Applicant: FANUC CORPORATION, Minamitsuru-gun, Yamanashi (JP)

(72) Inventor: Masaru Oda, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 14/840,238

(22) Filed: Aug. 31, 2015

(65) Prior Publication Data

US 2016/0068352 A1  Mar. 10, 2016

(30) Foreign Application Priority Data

Sep. 10, 2014 (JP) ................. 2014-184545

(51) Int. Cl.
| | |
|---|---|
| *G06T 7/70* | (2017.01) |
| *G06T 7/11* | (2017.01) |
| *G06T 7/13* | (2017.01) |
| *G05D 3/12* | (2006.01) |
| *B25J 9/16* | (2006.01) |
| *B65G 43/08* | (2006.01) |

(52) U.S. Cl.
CPC ............... *G06T 7/11* (2017.01); *B25J 9/1679* (2013.01); *B25J 9/1697* (2013.01); *B65G 43/08* (2013.01); *G05D 3/12* (2013.01); *G06T 7/13* (2017.01); *G06T 7/70* (2017.01); *Y10S 901/02* (2013.01); *Y10S 901/47* (2013.01)

(58) Field of Classification Search
CPC ........ G05D 3/12; B65G 43/08; G06T 7/0085; G06T 7/004; G06T 7/11; G06T 7/13; G06T 7/70
See application file for complete search history.

(56) References Cited

U.S. PATENT DOCUMENTS 3,986,007 A * 10/1976 Ruoff, Jr. ................. B25J 15/08
250/548
5,796,868 A * 8/1998 Dutta-Choudhury ..... G06T 7/12
382/151
(Continued)

FOREIGN PATENT DOCUMENTS

DE  198 49 720 A1  5/2000
DE  196 35 979 C2  3/2003
(Continued)

OTHER PUBLICATIONS

Office Action issued in German Patent Application No. 10 2015 011 527.8 dated Jul. 19, 2016 (5 pages).

*Primary Examiner* — Thomas Randazzo
(74) *Attorney, Agent, or Firm* — RatnerPrestia (57) ABSTRACT

An article conveyor system comprising a conveyor device which conveys a conveyance article in accordance with a command to convey the conveyance article to a target position on a workpiece, a visual detection device which has a camera device which is attached to the conveyor device so as to acquire an image which includes both of the conveyance article and the workpiece after conveyance by the conveyor device and analyzes the image acquired by the camera device to detect the respective positions of the conveyance article and the workpiece, and a judgment device which judges if a position of the conveyance article which has been detected by the visual detection device is located within a permission area which is set for the position of the workpiece.

2 Claims, 4 Drawing Sheets

(56) References Cited

U.S. PATENT DOCUMENTS

| | | | | |
|---|---|---|---|---|
| 7,244,093 B2* | 7/2007 | Watanabe | ............. | B25J 9/1697 |
| | | | | 198/395 |
| 8,135,486 B2* | 3/2012 | Shindo | ............. | H01L 21/67259 |
| | | | | 356/400 |
| 8,770,247 B2* | 7/2014 | Oda | ....................... | B25J 9/0084 |
| | | | | 156/351 |
| 8,855,824 B2* | 10/2014 | Ogami | ................... | B25J 9/1682 |
| | | | | 700/245 |
| 8,872,913 B2* | 10/2014 | Wang | ................ | G05B 19/4015 |
| | | | | 348/95 |
| 9,275,886 B2* | 3/2016 | Fujimoto | ............. | G01B 11/002 |
| 2005/0125993 A1* | 6/2005 | Madsen | ............. | H05K 13/0053 |
| | | | | 29/739 |
| 2012/0229620 A1* | 9/2012 | Ikeda | ................... | B25J 9/1697 |
| | | | | 348/94 |
| 2012/0236140 A1* | 9/2012 | Hazeyama | ............ | B25J 9/1697 |
| | | | | 348/94 |
| 2013/0329954 A1* | 12/2013 | Ikeda | ................... | G06T 1/0007 |
| | | | | 382/103 |

FOREIGN PATENT DOCUMENTS

| | | | | |
|---|---|---|---|---|
| JP | 8118274 | | 5/1996 | |
| JP | 8153768 | | 6/1996 | |
| JP | 9160651 | | 6/1997 | |
| JP | 2005-011580 A | | 1/2005 | |
| JP | 2009-148845 | * | 7/2009 | ............. B25J 13/08 |
| JP | 2009148845 | | 7/2009 | |

\* cited by examiner

FIG. 4 under/with the conveyance article and the workpiece, and a judgment

ARTICLE CONVEYOR SYSTEM

BACKGROUND OF THE INVENTION

1. Field of the Invention

The present invention relates to an article conveyor system which is capable of confirming if a conveyance article has been accurately positioned with respect to a workpiece during a conveyance process for conveying the conveyance article toward the workpiece.

2. Description of the Related Art

Article conveyor systems which convey various conveyance articles toward a workpiece have been known from the past. Further, in recent years, article conveyor systems with visual sensors which can visually detect the positions of a conveyance article and workpiece have been spreading. For example, JP2005-11580A proposes a robot system which conveys a conveyance article toward a workpiece, using position information which has been acquired by a visual sensor. More specifically, in the robot system which is described in JP2005-11580A, a visual sensor which is attached to the second hand acquires position information of a cable with a connector which is gripped by the first hand as well as position information of an opposing connector which is placed on a table. The first hand then conveys the cable with the connector toward the opposing connector, using the position information which has been acquired by the visual sensor. In this way, a conveyance article (i.e., cable with a connector) is assembled into a workpiece (i.e., opposing connector).

However, even if a visual sensor is used to acquire accurate position information, a certain extent of conveyance error will unavoidably occur during the conveyance process by the robot in the case where the operational precision of the robot is insufficient. That is, even if a visual sensor is used to acquire accurate position information, it is not possible to guarantee the positioning precision of the conveyance article with respect to the workpiece. Further, in the robot system which is described in JP2005-11580A, in order to confirm if the conveyance article has been accurately positioned with respect to the workpiece, the visual sensor attached to the second hand has to be moved close to the conveyance article and workpiece, and then the visual sensor has to acquire an image including both the conveyance article and workpiece. In this way, in a conventional article conveyor system, a large amount of man hours were required for confirming if a conveyance article has been accurately positioned with respect to a workpiece.

An article conveyor system which is capable of confirming if a conveyance article has been accurately positioned with respect to a workpiece during a conveyance process for conveying the conveyance article toward the workpiece has therefore been sought.

SUMMARY OF INVENTION

According to a first aspect of the present invention, there is provided an article conveyor system comprising a conveyor device which conveys a conveyance article in accordance with a command to convey the conveyance article to a target position on a workpiece, a visual detection device which has a camera device which is attached to the conveyor device so as to acquire an image which includes both of the conveyance article after conveyance by the conveyor device and the workpiece, and analyzes the image acquired by the camera device to detect the respective positions of the conveyance article and the workpiece, and a judgment device which judges if a position of the conveyance article detected by the visual detection device is located within a permission area which is set for the position of the workpiece.

According to a second aspect of the present invention, there is provided the article conveyor system in the first aspect, wherein the conveyor device the conveyor device performs a transport process for transporting the conveyance article toward the target position if a position of the conveyance article detected by the visual detection device is not located within the permission area, the visual detection device performs a secondary detection process for detecting a position of the conveyance article after transport by the transport process, the judgment device performs a secondary judgment process for judging if the position of the conveyance article detected in the secondary detection process is located within the permission area, and the article conveyor system further comprising a control system which controls the conveyor device, the visual detection device, and the judgment device so that the transport process, the secondary detection process, and the secondary judgment process are repeatedly performed a predetermined number of times at most.

According to a third aspect of the present invention, there is provided the article conveyor system in the second aspect, wherein the control system sets as a setting value of transport distance in the transport process, a value smaller than a distance between the position of the conveyance article detected by the visual detection device and the target position.

According to a fourth aspect of the present invention, there is provided the article conveyor system in the third aspect, wherein the control system changes the setting value of transport distance so that a ratio of the setting value of transport distance to the distance between the detected position of the conveyance article and the target position becomes smaller as the number of repetitions of the transport process increases.

These and other objects, features, and advantages of the present invention will become clearer with reference to the detailed description of an illustrative embodiment of the present invention which is shown in the attached drawings.

DETAILED DESCRIPTION OF EMBODIMENTS

Below, an embodiment of the present invention will be explained in detail with reference to the drawings. In the drawings, similar component elements are assigned similar reference notations. Note that the following explanation does not limit the technical scope of the inventions which are described in the claims or the meaning of terms etc.

Figure 1:
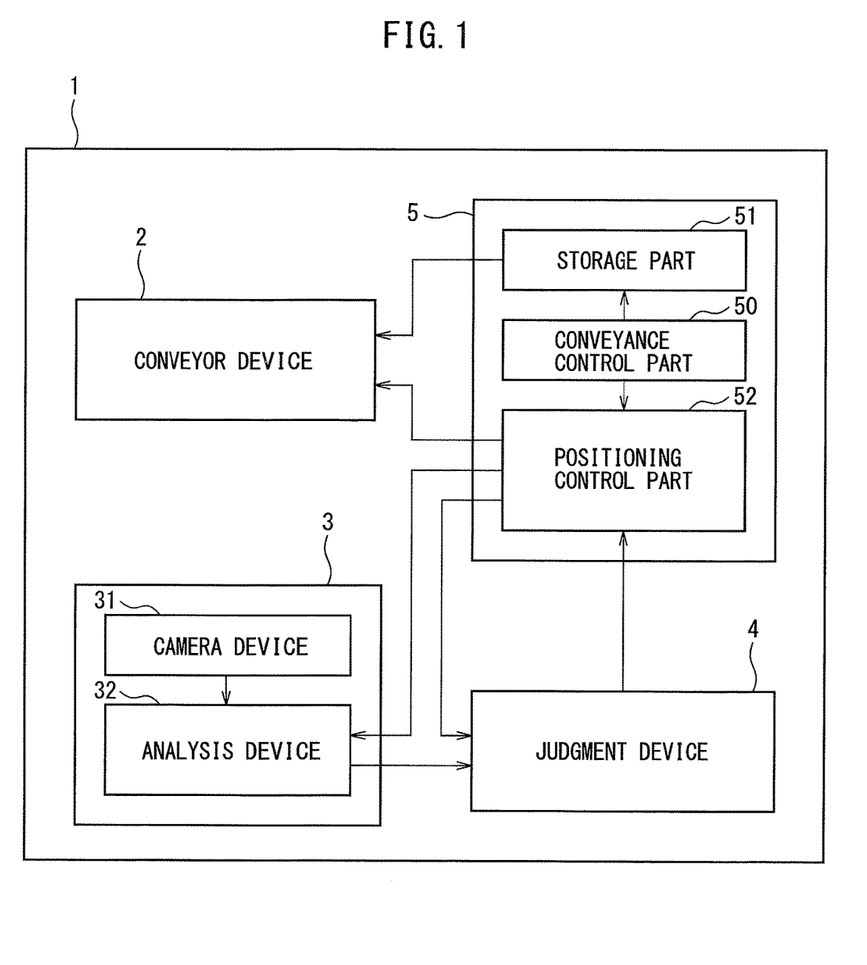
FIG. 1 is a block diagram which shows the configuration of an article conveyor system according to one embodiment of the present invention.

Referring to FIG. 1 to FIG. 4, an article conveyor system of one embodiment of the present invention will be explained. FIG. 1 is a block diagram which shows the configuration of an illustrative article conveyor system 1. Here, the article conveyor system 1 of the present embodiment is an automated system which conveys a conveyance article W1 which is fed to a predetermined feed position, toward a target position which is set on a workpiece W2, then positions the conveyed conveyance article W1 with respect to the target position (see FIG. 2 as well). The process in which the article conveyor system 1 conveys the conveyance article W1 toward the target position will be referred to below as the "conveyance process", while the process in which the article conveyor system 1 positions the conveyance article W1 with respect to the target position will be referred to below as the "positioning process". Furthermore, the series of processes comprising the conveyance process and positioning process will be referred to below as the "conveyance and positioning process".

As shown in FIG. 1, the article conveyor system 1 of the present embodiment comprises a conveyor device 2, visual detection device 3, judgment device 4, and control system 5. Here, the conveyor device 2 of the present embodiment conveys a conveyance article W1 in accordance with a command to convey the conveyance article W1 to a target position on a workpiece W2. Such a command is stored in advance in a storage part 50 of the control system 5. Further, the visual detection device 3 of the present embodiment acquires position information of the conveyance article W1 which has been conveyed by the conveyor device 2. Further, the judgment device 4 of the present embodiment performs a predetermined judgment, using the position information acquired by the visual detection device 3. Further, the control system 5 of the present embodiment controls the operations of the conveyor device 2, the visual detection device 3, etc., using the results of judgment of the judgment device 4. The functions, structures, etc. of these devices will be explained in detail below.

Figure 2:
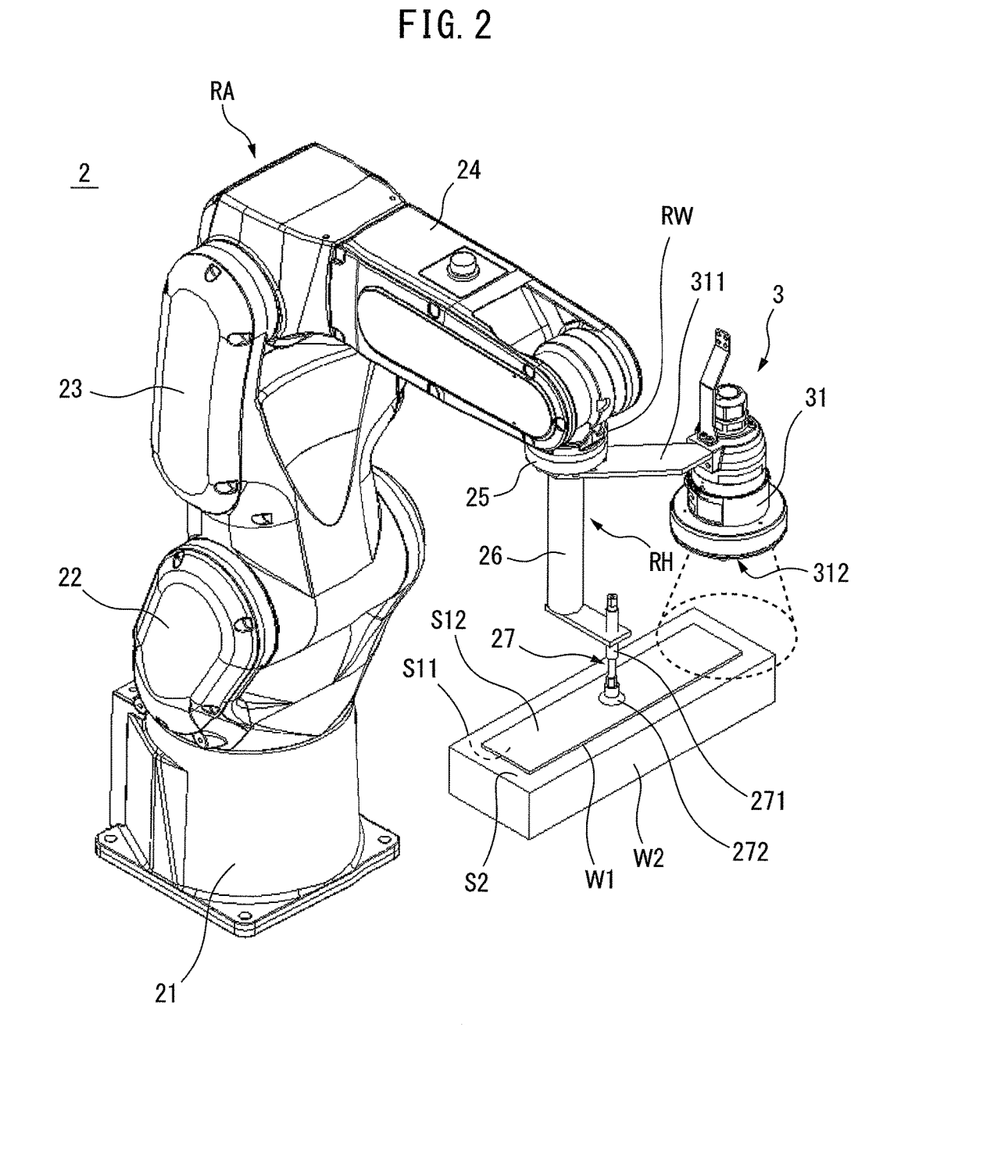
FIG. 2 is a perspective view which shows a conveyor device and visual detection device of the article conveyor system of FIG. 1.

FIG. 2 is a perspective view which shows a conveyor device 2 and visual detection device 3 in the article conveyor system 1 of FIG. 1 together with the conveyance article W1 and workpiece W2. As shown in FIG. 2, the conveyance article W1 of the present embodiment forms an elongated flat plate shape, while the workpiece W2 of the present embodiment forms a flat plate shape larger and thicker than the conveyance article W1. That is, the length of the workpiece W2 in the direction of extension is larger than the length of the conveyance article W1 in the direction of extension and the width of the workpiece W2 vertical to the direction of extension is larger than the width of the conveyance article W1 vertical to the direction of extension. For this reason, if the conveyance article W1 is suitably positioned with respect to the workpiece W2, the main surface S11 as a whole of the conveyance article W1 will contact the facing main surface S2 of the workpiece W2. Note that, the workpiece W2 of the present embodiment is arranged near the conveyor device 2 before the conveyance process. FIG. 2 shows the positional relationship between the conveyance article W1 and the workpiece W2 right after the conveyance process by the article conveyor system 1 ends.

As shown in FIG. 2, the conveyor device 2 of the present embodiment is a vertical articulated robot which comprises an arm RA which has a wrist part RW at its front end, and a hand RH which is attached to the wrist part RW. More specifically, the arm RA of the present embodiment comprises a fixed base part 21 which is fixed to a floor surface, a swivel base part 22 which is attached to the fixed base part 21, a swivel type lower arm part 23 which is connected to a top end part of the swivel base part 22, a swivel type upper arm part 23 which is connected to a front end part of the lower arm part 23, and a swivel type wrist part RW which is connected to the front end part of the upper arm part 24. Further, the arm RA of the present embodiment can freely change the position and posture of the hand RH which is attached to the wrist part RW by means of servo motors or other drive devices for driving various part of the art RA. Due to this, the arm RA of the present embodiment can convey the conveyance article W1 which the hand RH has gripped at the above feed position toward the workpiece W2 which is arranged near the conveyor device 2 in advance. The principle by which the hand RH grips the conveyance article W1 will be explained later.

As shown in FIG. 2, the hand RH of the present embodiment has a base end part 25 which is attached to the wrist part RW of the arm RA, a main body part 26 which extends from the base end part 25, and a suction part 27 which is attached to the front end part of the main body part 26. More specifically, the main body part 26 of the hand RH forms an L-shape including a projecting part which projects out from the base end part 25 to the opposite side from the wrist part RW and a vertical part which extends vertically from the front end part of the projecting part. Further, the suction part 27 of the hand RH has a nozzle 271 which is fit into a through hole which is formed on the vertical part of the main body part 26, and a vacuum pad 272 which is attached to the front end part of the nozzle 271. Further, the base end part of the nozzle 271 is connected through a not shown air tube to a vacuum pump or other vacuum feed source. Therefore, if the vacuum pad 272 is brought into contact with the main surface S12 of the conveyance article W1 and in that state the gas inside the vacuum pad 272 is exhausted by the vacuum feed source, the action of the negative pressure formed inside the vacuum pad 272 will cause the conveyance article W1 to be picked up by suction by the vacuum pad 272.

Next, the visual detection device 3 of the present embodiment will be explained. The visual detection device 3 of the present embodiment includes a camera device 31 which is attached to the hand RH through a predetermined attachment member 311, and an analysis device 32 which analyzes the image acquired by the camera device 31. The camera device 31 of the present embodiment is a digital camera which is provided with a CCD (charge coupled device) image sensor or a CMOS (complementary metal-oxide semiconductor) image sensor or other imaging device. As shown in FIG. 2, the camera device 31 of the present embodiment is attached to the hand RH so as to be able to acquire an image including both of the conveyance article W1 and the workpiece W2 once the conveyance process is completed. More specifically, the camera device 31 of the present embodiment is attached to the hand RH so that the front end face 312 of the lens assembly which is located in front of the imaging plane is separated above from a virtual plane including the suction holding surface of the vacuum pad 272, and so that the imaging plane becomes substantially parallel to that virtual plane. Therefore, the camera device 31 can capture the main surface S12 of the conveyed conveyance article W1 together with the main surface S2 of the workpiece W2 which is located behind the conveyance article W1. In the article conveyor system 1 of the present embodiment, there is no need for the conveyance article W1 and workpiece W2 as a whole to be captured. It is sufficient that part of the main surface S12 of the conveyance article and part of the main surface S2 of the workpiece behind the conveyance article be captured.

Figure 3:
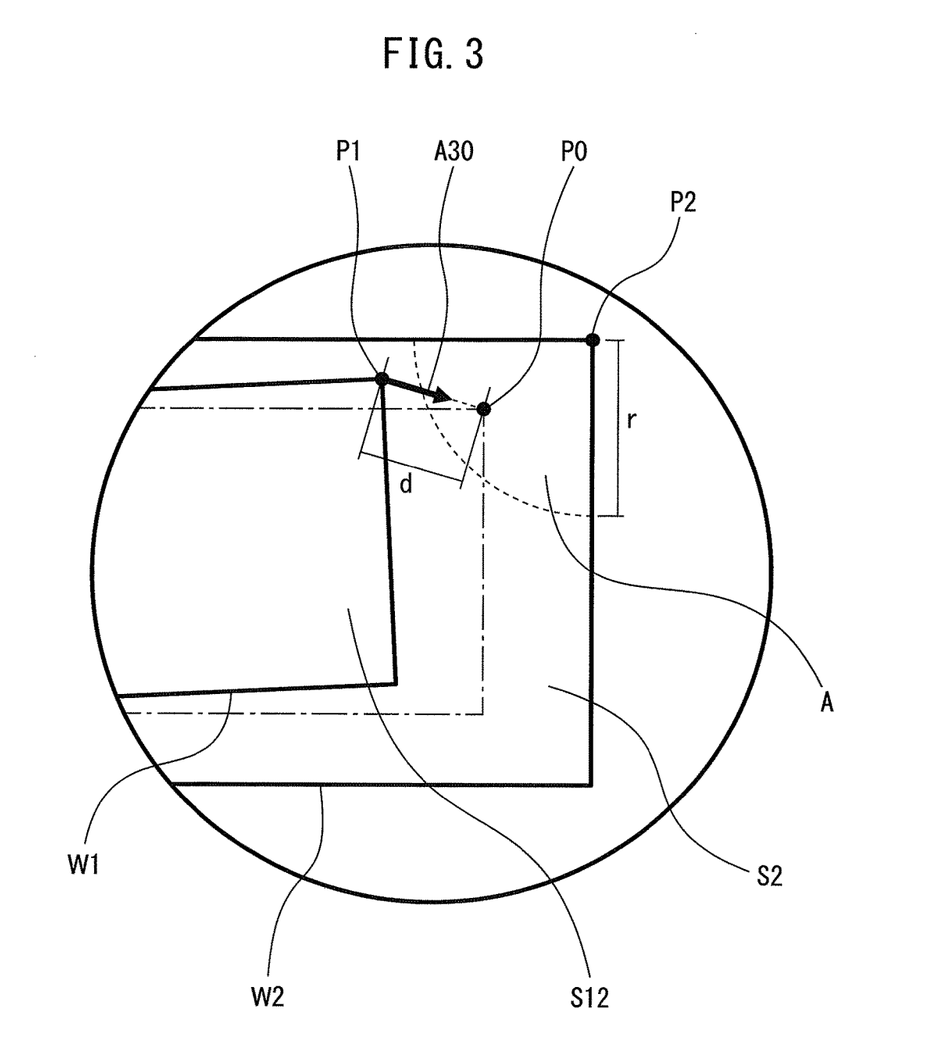
FIG. 3 is a schematic view which shows one example of an image which is captured by a camera device of the visual detection device of FIG. 2.

FIG. 3 is a schematic view which shows one example of an image which is captured by the camera device 31 of the visual detection device 3 of FIG. 2. Such a captured image is transmitted to the analysis device 32 of the visual detection device 3 (see FIG. 1). The analysis device 32 of the visual detection device 3 may be a device which is independent from the camera device 31 or may be built into the camera device 31. Further, the analysis device 32 of the visual detection device 3 may also be built into the judgment device 4 or control system 5. Further, the analysis device 32 of the present embodiment analyzes the received captured image to detect the positions of the workpiece W2 and conveyance article W1. More specifically, the analysis device 32 of the present embodiment detects the position of the representative point P1 of the conveyance article W1 and the position of the representative point P2 of the workpiece from the results of analysis of the received captured image. The positions of the representative points which are detected by the analysis device 32 will be referred to below as the "detected positions".

In the example of FIG. 3, as the representative point P1 of the conveyance article W1, the top right vertex of the rectangular main surface S12 of the conveyance article W1 is selected, while as the representative point P2 of the workpiece W2, the top right vertex of the rectangular main surface S2 of the workpiece W2 is selected. However, as the above representative points P1 and P2, any points on the main surfaces of the conveyable article W1 and workpiece W2 can be selected. Note that, in the captured image of FIG. 3, the detected position of the conveyance article W1 after the conveyance process is shown by the solid line, while the above target position which is preset on the main surface S2 of the workpiece W2 is shown by the one-dot chain line. Furthermore, in the captured image of FIG. 3, the representative point of the conveyance article W1 corresponding to the target position is shown by the reference notation P0. The position information of the conveyance article W1 and workpiece W2 which is detected by the analysis device 32 of the visual detection device 3 is transmitted to the above judgment device 4.

Next, the judgment device 4 of the present embodiment will be explained. As shown in FIG. 1, the judgment device 4 of the present embodiment has the function of judging if the detected position of the conveyance article W1 is located inside an allowable area A which is set with respect to the detected position of the workpiece W2, using position information which was acquired from the visual detection device 3. Referring to FIG. 3, in the article conveyor system 1 of the present embodiment, a fan shaped region with a radius "r" centered about a representative point P2 of the workpiece W2 is set as the above permission area A. Further, the judgment device 4 of the present embodiment judge if the detected position of the representative point P1 of the conveyance article W1 is located inside the above-mentioned fan-shaped permission area A, using the position information which was acquired from the visual detection device 3.

The size of the above permission area A, that is, the radius "r" of the fan shape, is determined in consideration of the allowable range of positioning error of the conveyance article W1 with respect to the target position. That is, when the detected position of the representative point P1 of the conveyance article W1 is located inside the permission area A, it is deemed that the positioning error of the conveyance article W1 with respect to the target position is within an allowable range. In this case, the above positioning process is omitted. On the other hand, when the detected position of the representative point P1 of the conveyance article W1 is not located inside the permission area A, the above positioning process is performed by the conveyor device 2, visual detection device 3, and judgment device 4. This point will be explained further later. The result of judgment by the judgment device 4 is transmitted to the above control system 5, and can be displayed on a display device which is installed in the article conveyor system 1 as required. Such a display device is installed in the judgment device 4 or control system 5, for example.

Next, the control system 5 of the present embodiment will be explained. As shown in FIG. 1, the control system 5 of the present embodiment comprises a storage part 50 which stores various data, a conveyance control part 51 which controls the operation of the system in the conveyance process, and a positioning control part 52 which controls the operation of the system in the above positioning process. The conveyance control part 51 of the present embodiment controls the operation of the conveyor device 2 in the conveyance process in accordance with the above command which is stored in the storage part 50. As a result, the conveyor device 2 grips the conveyance article W1 at the above feed position and then conveys the conveyance article W1 toward the target position on the workpiece W2. Further, the positioning control part 52 of the present embodiment controls the operations of the conveyor device 2, visual detection device 3, and judgment device 4 in the positioning process. The operations of the various devices in the positioning process of the present embodiment will be explained in detail below.

In the positioning process of the present embodiment, first, the conveyor device 2 transports the conveyance article W1 toward the target position which is described in the above command. This process will sometimes be referred to below as the "transport process". The direction in the transport process by which the conveyance article W1 is transported is shown by the arrow A30 in FIG. 3. In the positioning process of the present embodiment, next, the visual detection device 3 detects the position of the conveyance article W1 after the transport process. This process will sometimes be referred to below as the "secondary detection process". In the positioning process of the present embodiment, next, the judgment device 4 judges if the position of the conveyance article W1 which was detected at the secondary detection process is located within the above permission area A. This process will sometimes be referred to below as the "secondary judgment process". In this way, the positioning process of the present embodiment includes the transport process by the conveyor device 2, the secondary detection process by the visual detection device 3, and the secondary judgment process by the judgment device 4. Further, the positioning control part 52 of the present embodiment controls the respective operations of the conveyor device 2, visual detection device 3, and judgment device 4 so that the above transport process, secondary detection process, and secondary judgment process are repeatedly performed a predetermined number of times at most. However, even if the numbers of repetition of these processes do not reach the upper limit, the positioning process is ended at the point of time when the results of judgment of the secondary judgment process become true (that is, the detected position of the conveyance article W1 after the transport process enters the permission area A).

Figure 4:
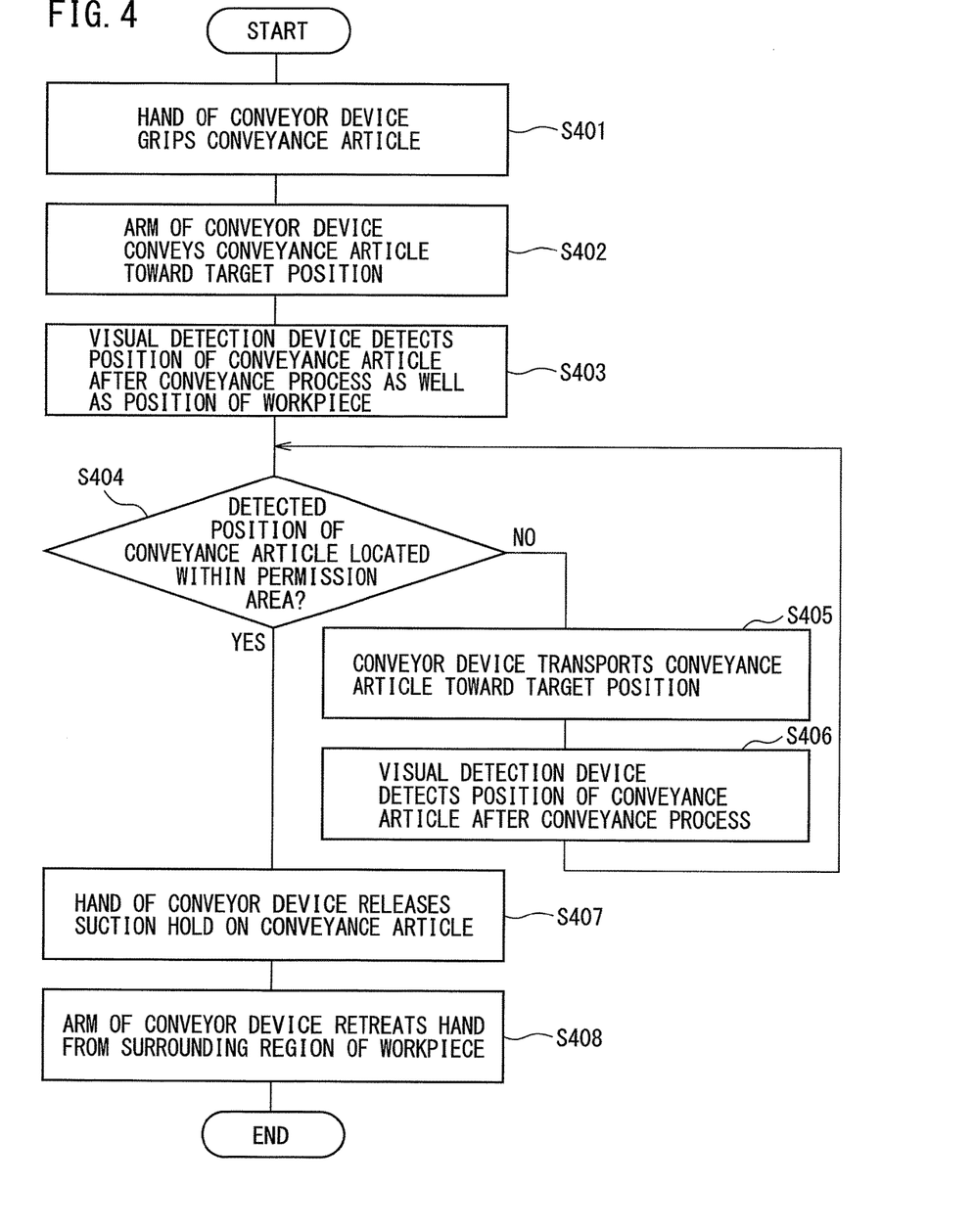
FIG. 4 is a flowchart which shows the routine of a conveyance and positioning process according to an article conveyor system of the present embodiment.

Next, the operation of the article conveyor system 1 of the present embodiment will be explained in brief. FIG. 4 is a flowchart which shows the routine of the conveyance and positioning process by the article conveyor system 1 of the present embodiment. As shown in FIG. 4, first, at step S401, the hand RH of the conveyor device 2 grips by suction the conveyance article W1 which is fed to a predetermined feed position. Next, at step S402, the hand RH of the conveyor device 2 conveys the conveyance article W1 which was gripped by the hand RH toward the target position on the workpiece W2. The routine shown by steps S401 and S402 corresponds to the above conveyance process. As explained above, the conveyor device 2 performs the conveyance process in accordance with the command which is stored in the storage part 50 of the control system 5.

Next, at step S403, the visual detection device 3 detects the position of the conveyance article W1 after the conveyance process as well as the position of the workpiece W2 (see FIG. 3). The position information of the conveyance article W1 and workpiece W2 which is detected at step S403 are transmitted to the judgment device 4. Next, at step S404, the judgment device 4 judges if the detected position of the conveyance article W1 at step S403 is located within the above permission area A. If the detected position of the conveyance article W1 is located within the permission area A (YES at step S404), the article conveyor system 1 skips the positioning process and proceeds to step S407. On the other hand, if the detected position of the conveyance article W1 is not located within the permission area A (NO at step S404), the conveyor device 2 performs the above transport process (step S405).

More specifically, at step S405, the conveyor device 2 transports the conveyance article W1 to the target position on the workpiece W2. As explained above, in FIG. 3, the detected position of the conveyance article W1 is shown by the solid line, while the target position of the conveyance article W1 is shown by the one-dot chain line. Further, in FIG. 3, the transport direction of the conveyance article W1 in the transport process is shown by the arrow A30. Referring to FIG. 3, at the transport process (step S405), the above positioning control part 52 sets as the transport distance of the conveyance article W1, a value smaller than the distance "d" between the detected position (P1) and target position (P0) of the conveyance article W1. It is therefore possible to prevent the conveyance article W1 from being transported beyond the target position due to the positioning error of the conveyor device 2. The phenomenon of the conveyance article W1 being transported beyond the target position in this way will be referred to as "overshoot". The ratio α of the setting value "x" of the transport distance with respect to the distance "d" between the detected position (P1) and target position (P0) of the conveyance article W1 is for example 70% (α=x/d=0.7).

Referring again to FIG. 4, at step S406, the visual detection device 3 performs the above secondary detection process. More specifically, at step S406, the visual detection device 3 detects the position of the conveyance article W1 after the transport process. The position information of the conveyance article W1 detected at step S406 is transmitted to the judgment device 4. Next, at the second round of step S404 onward, the judgment device 4 performs the above secondary judgment process. More specifically, at the second round of step S404 onward, the judgment device 4 judges if the detected position of the conveyance article W1 at the immediately preceding secondary detection process (step S406) is located within the permission area A. Such a routine of the steps S405, S406, and S404 corresponds to one cycle of the repeatedly performed positioning process. Such a routine is repeated until the result of judgment of the secondary judgment process (second and further instance of step S404) becomes true, that is, until the detected position of the conveyance article W1 at the secondary detection process (step S406) enters into the permission area A.

Note that, when the transport process of the conveyance article W1 (step S405) is repeated two times or more, the setting value "x" of the transport distance is changed so that the ratio α of the setting value "x" of the transport distance with respect to the above distance "d" becomes gradually smaller in accordance with the number of repetitions of the transport process. For example, if the above ratio α in the first transport process is 70%, the setting value "x" of the transport distance is changed so that the ratio α in the second transport process becomes 40%. Further, when the transport process is performed a third time, the setting value "x" of the transport distance is further changed so that the above ratio α becomes smaller than 40%. Normally, as the number of repetitions of the transport process becomes larger, the distance "d" between the detected position (P1) and the target position (P0) of the conveyance article W1 is smaller, and therefore overshoot may easily occur as a result of positioning error of the conveyor device 2. However, if the setting value "x" of the transport distance is suitably changed so that the above ratio α becomes gradually smaller, it is possible to prevent overshoot from occurring in the second round of the transport process onward. As a result, the conveyance article W1 can gradually approach the target position, and therefore it is possible to decrease the number of repetitions of the transport process until the detected position of the conveyance article W1 entering the permission area A. This ensures that the required time of the conveyance and positioning process is shortened.

Referring again to FIG. 4, at step S407, the hand RH of the conveyor device 2 releases the suction hold on the conveyance article W1. This ensures that the conveyance article W1 is released from the hand RH, and therefore the conveyance article W1 is placed on the main surface S2 of the workpiece W2. Next, at step S408, the arm RA of the conveyor device 2 retreats the hand RH from the surrounding region of the workpiece W2. After that, the article conveyor system 1 ends the conveyance and positioning process. However, the conveyor system 1 may start a conveyance and positioning process for a new conveyance article W1 as appropriate.

In the above way, in the article conveyor system 1 of the present embodiment, the respective positions of the conveyance article W1 after conveyance by the conveyor device 2 and workpiece W2 are detected by the visual detection device 3 which is attached to the conveyor device 2, and the position information which is detected by the visual detection device 3 is used as the basis for judging if the conveyance article W1 has been accurately positioned with respect to the workpiece W2. Therefore, according to the article conveyor system 1 of the present embodiment, it becomes possible to easily confirm if a conveyance article W1 has been accurately positioned with respect to a workpiece W2 in a conveyance process for conveying the conveyance article W1 toward a workpiece W2.

EFFECT OF INVENTION

According to the first aspect of the present invention, the respective positions of the conveyance article after conveyance by the conveyor device and workpiece are detected by a visual detection device which is attached to the conveyor device, and the position information which the visual detection device detects is used as the basis for judging if the conveyance article is accurately positioned with respect to the workpiece. Therefore, according to the first aspect, it is possible to easily confirm whether the conveyance article is accurately positioned with respect to the workpiece during the conveyance process for conveying the conveyance article toward the workpiece.

According to the second aspect of the present invention, the transport process of the conveyance article is repeated until the position of the conveyance article detected by the visual detection device enters the permission area, and therefore it is possible to position the conveyance article with respect to the processed workpiece with a high precision.

According to the third aspect of the present invention, a value smaller than the distance between the detected position and target position of the conveyance article is set as the transport distance of the conveyance article, and therefore it is possible to prevent the conveyance article from being transported beyond the target position due to the positioning error of the conveyor device.

According to the fourth aspect of the present invention, the setting value of the transport distance is changed so that the ratio of the setting value of the transport distance to the above distance becomes smaller as the number of repetitions of the transport process becomes greater, and therefore even if the transport process of the conveyance article is repeatedly performed, it is possible to prevent conveyance article from being transported beyond the target position due to the positioning error of the conveyor device.

The present invention is not limited to the above-mentioned embodiment and can be modified in various ways within the scope described in the claims. For example, in the above embodiment, as the conveyor device 2, a vertical articulated robot was illustrated, but the conveyor device 2 of the article conveyor system 1 in the present invention can be any mechanical device, including a horizontal articulated robot, orthogonal robot, etc., which can convey a conveyance article W1 to a preset target position. Further, the conveyor device 2 of the article conveyor system 1 in the present invention may be provided with an electromagnetic attraction type or servo drive type of hand RH instead of the vacuum suction type hand RH which is illustrated in the above embodiment. Further, the structures, functions, etc. of the various apparatuses of the article conveyor system 1 which is described in the above embodiments are only examples. Various structures, functions, etc. can be employed for achieving the effects of the present invention. Dimensions, shapes, etc., of the conveyance article W1 and workpiece W2 described in the above embodiments are only examples. Various dimensions, shapes, etc. can be employed for the conveyance article W1 and workpiece W2.

The invention claimed is:

1. An article conveyor system comprising:
    a conveyor device which conveys a conveyance article in accordance with a command to convey said conveyance article to a target position on a workpiece,
    a visual detection device which has a camera device which is attached to said conveyor device so as to acquire an image which includes both of said conveyance article after conveyance by said conveyor device and said workpiece, and analyzes said image acquired by said camera device to detect the respective positions of said conveyance article and said workpiece, and
    a judgment device which judges if an edge of said conveyance article detected by said visual detection device is located within a permission area which is set within a region on said workpiece, the region is an area on said workpiece located within a predetermined radius measured from an edge of said workpiece, wherein
    said conveyor device performs a transport process for transporting the edge of said conveyance article toward said target position if an edge of said conveyance article detected by said visual detection device is not located within said permission area,
    said visual detection device performs a secondary detection process for detecting the edge of said conveyance article after transport by said transport process,
    said judgment device performs a secondary judgment process for judging if the edge of said conveyance article detected in said secondary detection process is located within said permission area, wherein
    said article conveyor system further comprising a control system which controls said conveyor device, said visual detection device, and said judgment device so that said transport process, said secondary detection process, and said secondary judgment process are repeatedly performed a predetermined number of times at most, and wherein
    said control system sets as a setting value of transport distance in said transport process, a value smaller than a distance between the edge of said conveyance article detected by said visual detection device and said target position.

2. The article conveyor system according to claim 1, wherein
    said control system changes said setting value of transport distance so that a ratio of said setting value of transport distance to said distance becomes smaller as the number of repetitions of said transport process increases.

* * * * *